(12) United States Patent
Barnett et al.

(10) Patent No.: US 7,770,208 B2
(45) Date of Patent: Aug. 3, 2010

(54) COMPUTER-IMPLEMENTED METHOD, APPARATUS, AND COMPUTER PROGRAM PRODUCT FOR SECURING NODE PORT ACCESS IN A SWITCHED-FABRIC STORAGE AREA NETWORK

(75) Inventors: Barry Stanley Barnett, Austin, TX (US); Daniel G. Eisenhauer, Austin, TX (US); Matthew Eugene Landt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 11/277,653

(22) Filed: Mar. 28, 2006

(65) Prior Publication Data
US 2007/0239989 A1 Oct. 11, 2007

(51) Int. Cl.
*G06F 15/173* (2006.01)
*G06F 7/04* (2006.01)

(52) U.S. Cl. ................. 726/2; 726/3; 709/201

(58) Field of Classification Search ............ 726/4, 726/3, 2, 5, 11, 12, 14; 370/386, 254, 381, 370/389; 709/201, 213, 216, 225; 713/150, 713/153
See application file for complete search history.

(56) References Cited

U.S. PATENT DOCUMENTS

| | | | |
|---|---|---|---|
| 6,347,334 B1 | 2/2002 | Fredericks et al. | |
| 6,807,579 B1 | 10/2004 | Frazier | |
| 2002/0095602 A1 | 7/2002 | Pherson et al. | |
| 2002/0191602 A1 | 12/2002 | Woodring et al. | |
| 2002/0191649 A1 | 12/2002 | Woodring | |
| 2003/0103504 A1 | 6/2003 | Dugan et al. | |
| 2003/0135620 A1 | 7/2003 | Dugan et al. | |
| 2003/0179748 A1 | 9/2003 | George et al. | |
| 2004/0088437 A1 | 5/2004 | Stimac | |
| 2004/0160953 A1* | 8/2004 | Banks et al. | ............... 370/386 |
| 2005/0018619 A1 | 1/2005 | Banks et al. | |
| 2005/0018672 A1 | 1/2005 | Dropps et al. | |
| 2005/0060574 A1 | 3/2005 | Klotz et al. | |

* cited by examiner

*Primary Examiner*—Kimyen Vu
*Assistant Examiner*—Edward Zee
(74) *Attorney, Agent, or Firm*—Yee & Associates, P.C.; Libby Z. Toub

(57) ABSTRACT

A computer-implemented method, apparatus, and computer program product are disclosed for securing node port access in a switched-fabric storage area network. Permitted combinations of fabric port identifiers and node port identifiers are specified. A node port receives a request to access the node port. A node port identifier, which identifies the device that is attempting to access the node port, is determined from the request. A fabric port identifier is determined that identifies a fabric port through which the device transmitted the request. Access to the node port is granted if the fabric port identifier and node port identifier form a permitted combination.

20 Claims, 7 Drawing Sheets

| SWITCH PORT WWPN F-PORTS | HOST/STORAGE PORT WWPN N-PORTS |
|---|---|
| 1234ABCD5678ABCD F-PORT1 | ABCD23456789CDEF N-PORT1 |
| DEFCBCDE4567A456 F-PORT2 | 345678901234A345 N-PORT2 |
| ∘∘∘ | ∘∘∘ |
| EFCABAB12345D456 F-PORT6 | 1112AACCCDEEFA1C4 N-PORT6 |

FIG. 2

| SWITCH PORT WWPN F-PORTS | HOST/STORAGE PORT WWPN N-PORTS | HOST SIDs |
|---|---|---|
| 1234ABCD5678ABCD F-PORT1 | ABCD23456789CDEF N-PORT1 | SID OF N-PORT1 |
| DEFCBCDE4567A456 F-PORT2 | 345678901234A345 N-PORT2 | SID OF N-PORT2 |
| ∘∘∘ | ∘∘∘ | ∘∘∘ |
| EFCABAB12345D456 F-PORT6 | 1112AACCCDEEFA1C4 N-PORT6 | SID OF N-PORT6 |

```
START (400)
  ↓
GENERATE AN ASSOCIATION TABLE (402)
  ↓
ALL SWITCHES AND/OR STORAGE SUBSYSTEMS IMPORT THE ASSOCIATION TABLE (404)
  ↓
RESTART ALL SWITCHES, WHICH FORCES ALL HOSTS AND STORAGE SUBSYSTEMS TO LOG BACK IN TO FABRIC USING A FLOGI REQUEST (406)
  ↓
EACH STORAGE SUBSYSTEM FORCES ALL HOSTS TO LOG BACK IN TO STORAGE SUBSYSTEM USING A PLOGI REQUEST (408)
  ↓
STOP (410)
```

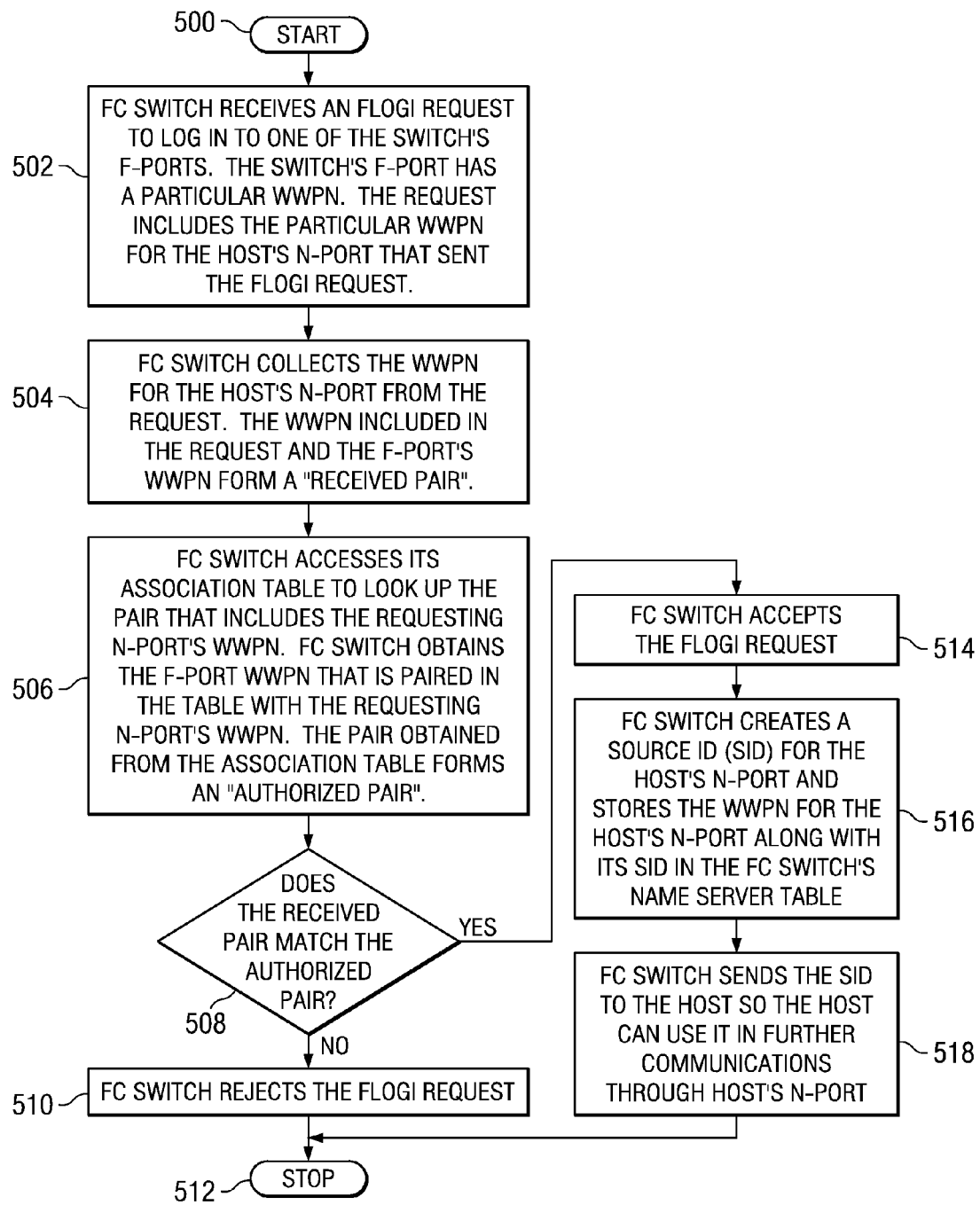

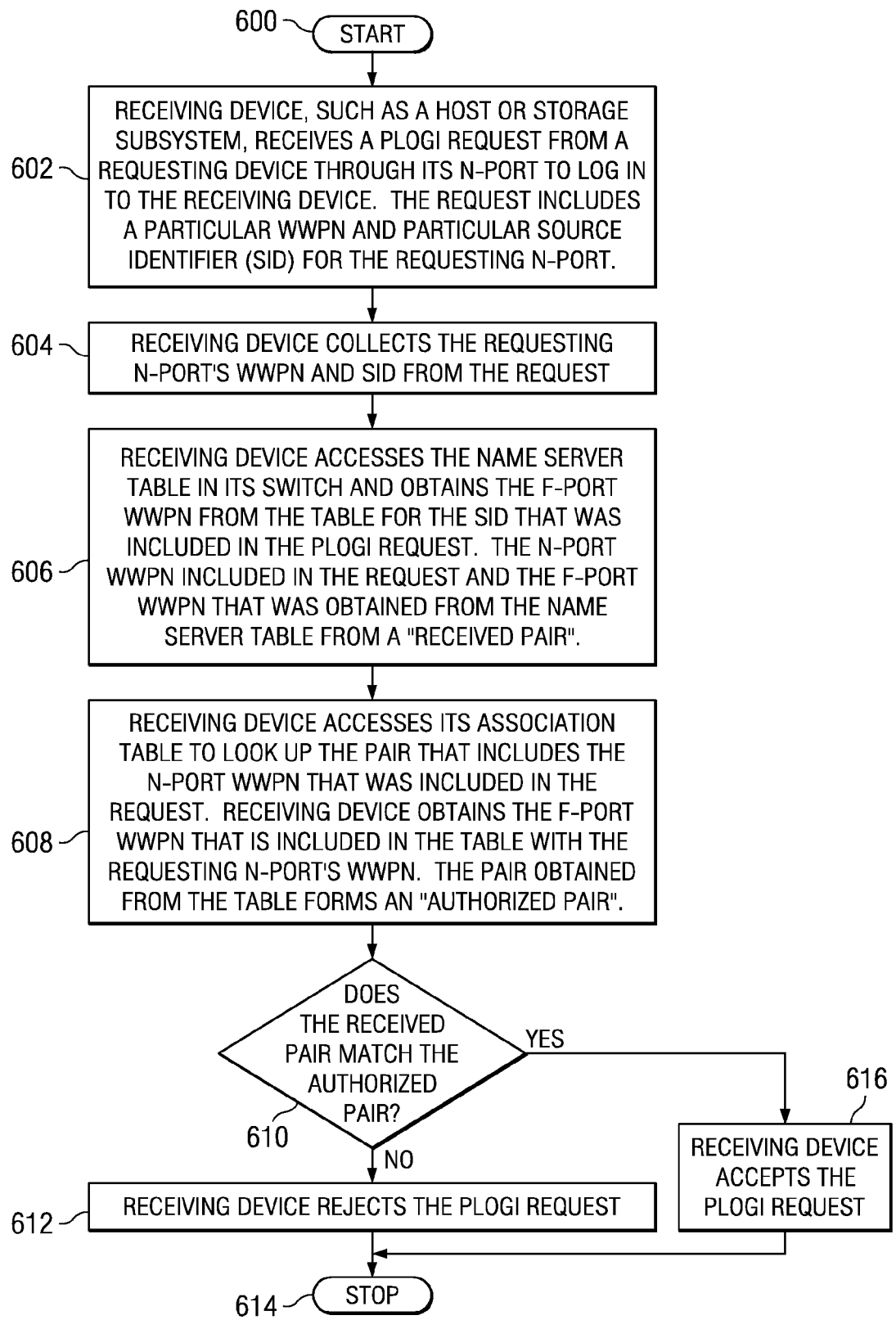

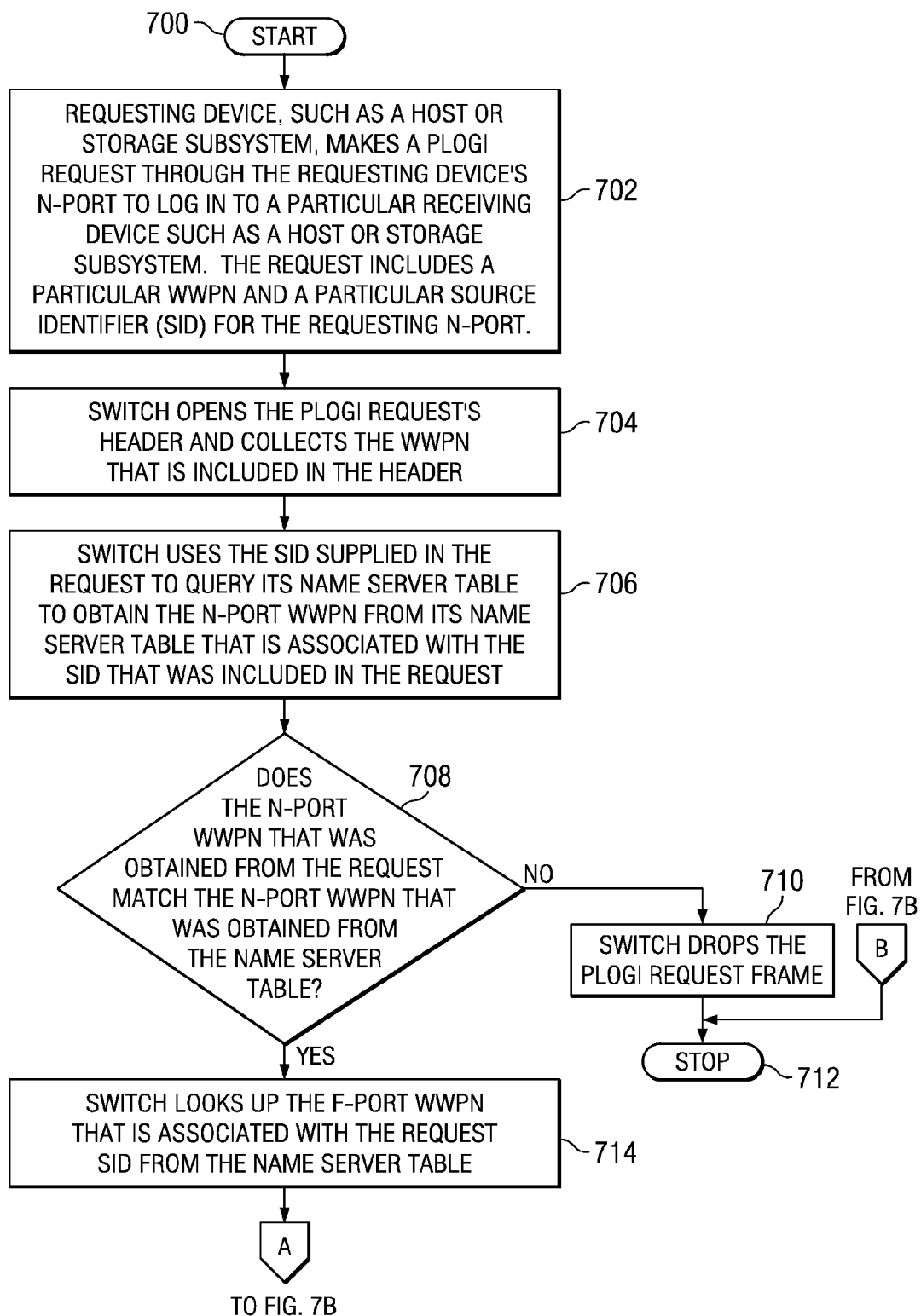

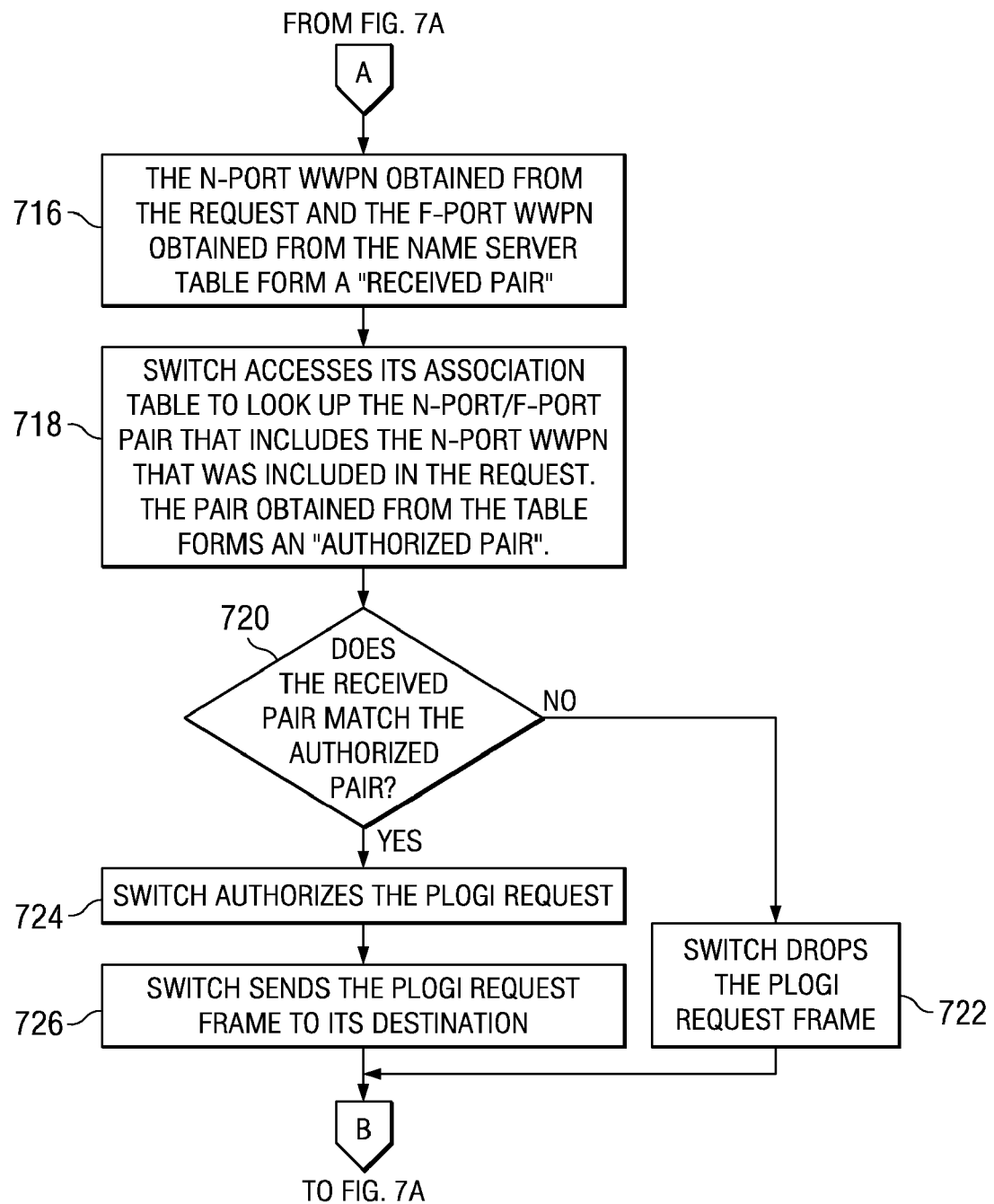

COMPUTER-IMPLEMENTED METHOD, APPARATUS, AND COMPUTER PROGRAM PRODUCT FOR SECURING NODE PORT ACCESS IN A SWITCHED-FABRIC STORAGE AREA NETWORK

BACKGROUND OF THE INVENTION

1. Field of the Invention

The present invention relates generally to data processing systems. More specifically, the present invention is directed to a computer-implemented method, apparatus, and computer program product for securing access to node ports in a switched-fabric storage area network.

2. Description of the Related Art

A switched-fabric storage area network (SAN) is a dedicated network that serves to interconnect storage-related resources available to one or more networked servers. A SAN is typically separate from local area networks (LANs) and wide area networks (WANs). SANs are often characterized by high interconnection data rates between member storage peripherals. SANs are also often characterized by highly scalable architectures. SANs include both hardware and software for hardware management, monitoring, and configuration.

Fibre Channel (FC) Storage Area Networks (SAN) are highly prone to premeditated and accidental compromise by an unauthorized agent. When a Fibre Channel Storage Area Network (FC SAN) is compromised, the data contained in the attached storage devices can be stolen, changed, or destroyed by the unauthorized agent. The Fiber Channel Storage Area Network can be compromised in two broad ways: (1) unauthorized access to any of the components comprising the Storage Area Network itself, or (2) unauthorized access to any of the network-attached systems able to access any of the components comprising the Storage Area Network.

A host that is attached to the Fibre Channel Storage Area Network can try maliciously to gain access to a storage component for which it is not authorized. This type of attack is called spoofing, in which an unauthorized entity or agent tries to appear as an authorized entity or agent through some sort of deception. There are two scenarios in which spoofing can be used to gain unauthorized access to a Storage Area Network storage component: (1) a spoofing host system can gain unauthorized access to the Fibre Channel (FC) switch and use any other visible host World Wide Port Name (WWPN) as its assigned WWPN to gain unauthorized access to a storage subsystem port, or (2) a spoofing host system that has authorized access to the Fibre Channel switch uses a visible WWPN different from its assigned WWPN to gain unauthorized access to a storage subsystem port.

Visible WWPNs are those WWPNs that a host can obtain via querying the well known name server service when logged into a Fibre Channel switch. These are the WWPNs that reside in the Fibre Channel switch active zone containing all the host ports and storage ports that can connect to each other. The WWPN is a programmable feature of host ports, i.e. Host Bus Adapters (HBAs), and can be programmed to any value relatively easily by a knowledgeable system programmer.

SUMMARY OF THE INVENTION

A computer-implemented method, apparatus, and computer program product are disclosed for securing node port access in a switched-fabric storage area network. Permitted combinations of fabric port identifiers and node port identifiers are specified. A node port receives a request to access that node port. A node port identifier, which identifies the device that is attempting to access the node port, is determined from the request. A fabric port identifier is determined that identifies a fabric port through which the device transmitted the request. Access to the node port is granted if the fabric port identifier and node port identifier form a permitted combination.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts an association table in accordance with the illustrative embodiment of the present invention;

FIG. 3 depicts a name server table in accordance with the illustrative embodiment of the present invention;

FIG. 4 depicts a high level flow chart that illustrates generating an association table and forcing all devices to log back into the fabric and storage subsystem once the association table is imported into the switches and storage subsystems in accordance with the illustrative embodiment of the present invention;

FIG. 5 illustrates a high level flow chart that depicts restricting access to the fabric to only authorized devices in accordance with the illustrative embodiment of the present invention;

FIG. 6 depicts a high level flow chart that illustrates a receiving device restricting access to the receiving device to only those requesting devices that are authorized in accordance with the illustrative embodiment of the present invention;

FIGS. 7A and 7B together illustrate a high level flow chart that depicts a switch restricting access to a receiving device to only those requesting devices that are authorized in accordance with the illustrative embodiment of the present invention.

DETAILED DESCRIPTION OF THE PREFERRED EMBODIMENT

Figure 1:
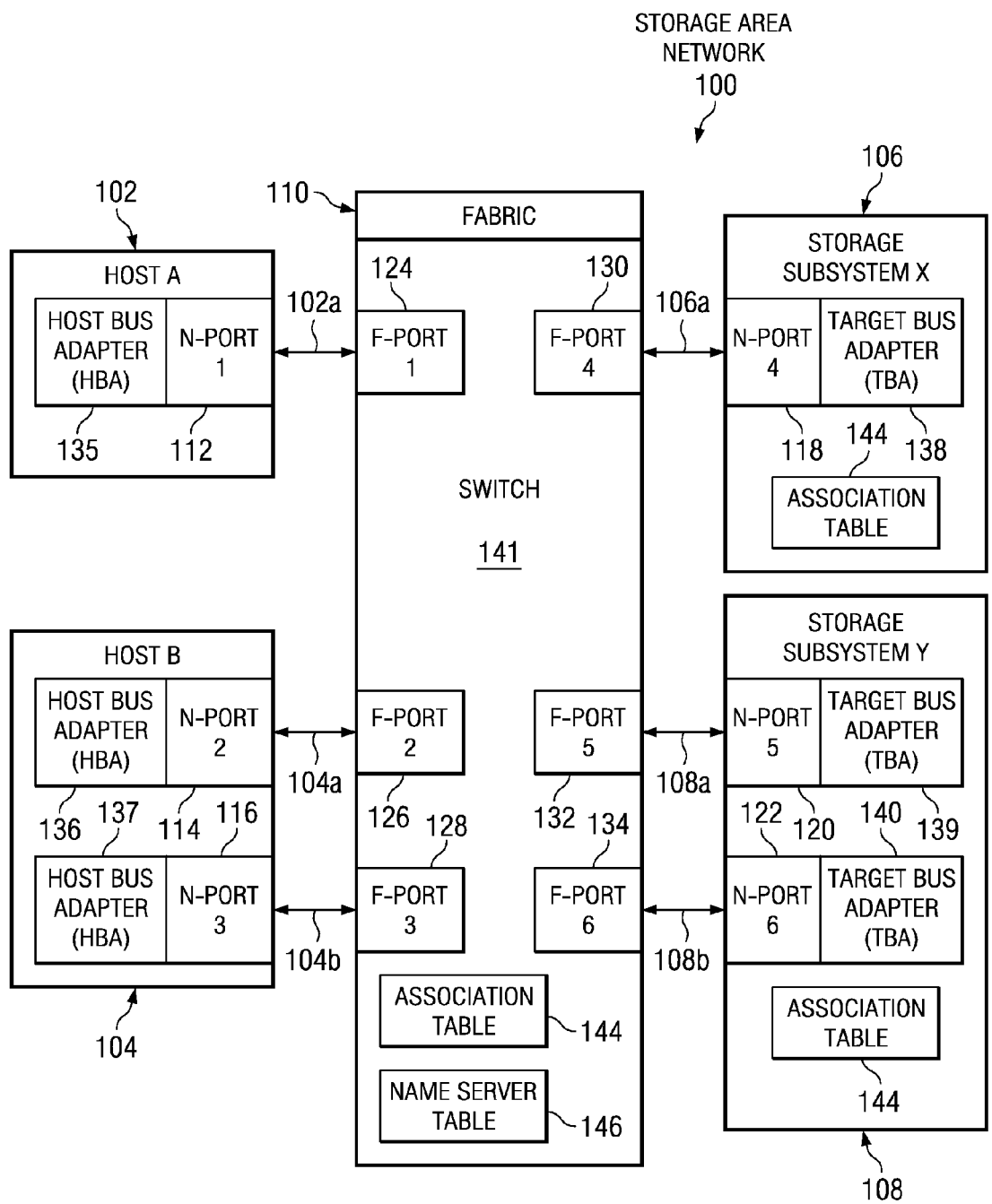
FIG. 1 is a block diagram of a storage area network that includes multiple nodes that are coupled together utilizing a switched fabric in accordance with the illustrative embodiment of the present invention.

The illustrative embodiment of the present invention is a computer-implemented method, apparatus, and computer program product for securing node port access in a switched-fabric storage area network. The computer-implemented method, apparatus, and computer program product includes an association table that encodes authorized fabric port (F-port) and node port (N-port) identifiers. These identifiers are preferably port names such as World Wide Port Names (WWPNs).

The association table establishes the authorized host and storage physical connectivity to a switch within the storage area network's fabric. For example, the association table may include an entry that specifies an F-port WWPN of ABCD123456789ABB and an N-port WWPN of ABCD123456789ABC. In this example, a storage subsystem or host will permit a node having an N-port WWPN of ABCD123456789ABC to access that host or storage subsystem if the node logged into the fabric through a switch port having an F-port WWPN of ABCD123456789ABB. A node having an N-port WWPN of ABCD123456789ABC would not be granted access to the storage subsystem or host if that node logged into the fabric through a switch port having an F-port WWPN that is not ABCD123456789ABB.

All authorized World Wide Port Names are unique within the storage area network. Therefore all of the F-port and N-port pairs contained in association table are also unique. The illustrative embodiment of the present invention can detect any attempt to duplicate any N-port or F-port WWPN from an unauthorized host because the unauthorized host will be connected to the fabric using an F-port that is different from the F-port used by the legitimate host. Therefore, the combination of the duplicate N-port WWPN and F-port used by the unauthorized host will not match any of the allowable pairs contained in association table.

Nodes log into the fabric by accessing a switch and executing a fabric login (FLOGI) request. An FLOGI request is required in order for the node port to establish a session with the switch and thus the fabric.

Secure access to the fabric is enforced by the switch at the time an FLOGI is requested. When a node port requests an FLOGI, the node port must provide its WWPN to the switch. According to the illustrative embodiment of the present invention, all FLOGI requests are first validated before they are completed. In order for an FLOGI request to be validated by the switch, the switch first determines which N-port WWPN was supplied by the requesting node port. The switch then determines through which one of its F-ports the FLOGI was received and identifies that F-port's WWPN. The WWPN supplied by the node port and the WWPN through which the request was received form a "received pair".

The switch then looks up the WWPN supplied by the requesting N-port in the association table that is stored in the switch to locate an F-port/N-port pair that includes the N-port WWPN. The F-port/N-port pair of WWPNs found in the association table define an "authorized pair". If the received pair matches the authorized pair, the FLOGI request is processed and the switch logs the N-port into the fabric.

If the received pair does not match the authorized pair, the FLOGI request is rejected and is not processed. In this case, the N-port is not logged into the fabric.

Secure access to a storage subsystem is enforced by requiring that all nodes first be properly logged into the fabric using the FLOGI process described above. Once a node is properly logged into the fabric, the node may execute a port login (PLOGI) request in order to attempt to log into a particular storage subsystem or other target host. A port login is required in order to establish a session with a storage subsystem or other target host. The illustrative embodiment of the present invention provides two different embodiments for maintaining secure access to storage subsystems.

In the first embodiment, a copy of the association table is stored in each storage subsystem. When a storage subsystem receives a PLOGI request, the storage subsystem obtains the source identifier (SID) from the PLOGI request header. The storage subsystem then obtains the F-port WWPN that is associated with that SID from the switch name server. The storage subsystem then looks up the F-port WWPN in the association table that is stored in the storage subsystem to locate an F-port/N-port pair that includes the F-port WWPN. The storage subsystem determines whether the N-port WWPN provided with the PLOGI request matches the N-port WWPN that was paired with the F-port WWPN found in the association table. If the N-port WWPNs match, the storage subsystem validates and processes the PLOGI request to permit the requesting node to log into the storage subsystem. If the N-port WWPNs do not match, indicating a host WWPN spoofing attempt, the PLOGI request is rejected and the requesting node is not logged into the storage subsystem.

In the second embodiment, the validation is done by the switch instead of by the storage subsystem itself. In this embodiment the switch looks for PLOGI requests coming from N-ports. When the switch detects a PLOGI request to a particular storage subsystem, the switch obtains the source identifier (SID) from the PLOGI request and then uses that SID to determine, from the switch's name server table, the F-port WWPN that is associated with the SID. The switch then looks up the F-port WWPN in the association table that is stored in the switch to locate an F-port/N-port pair that includes the F-port WWPN. The switch determines whether the N-port WWPN provided with the PLOGI request matches the N-port WWPN that was paired with the F-port WWPN found in the association table. If the N-port WWPNs match, the switch validates the PLOGI request and transmits it to the storage subsystem for normal processing. If the N-port WWPNs do not match, indicating a host WWPN spoofing attempt, the switch rejects the PLOGI request by dropping the request and not forwarding it to the storage subsystem.

FIG. 1 is a block diagram of a storage area network that includes multiple nodes that are coupled together utilizing a switched fabric in accordance with the illustrative embodiment of the present invention. FIG. 1 depicts a storage area network (SAN) 100 in accordance with the present invention. SAN 100 includes multiple devices, such as host 102, host 104, storage subsystem 106, and storage subsystem 108.

SAN 100 is preferably a Fibre Channel network although other types of switched-fabric networks may be used to implement SAN 100. Fibre Channel is a protocol suite for transfer of data within a Storage Area Network. Fibre Channel is an architecture developed by a consortium of computer and mass storage device manufacturers that is defined by the American National Standards Institute (ANSI). Fibre Channel was designed for mass storage devices and other peripheral devices that require very high bandwidth. Using optical fiber to connect devices, Fibre Channel supports high data transfer rates. Additional information about Fibre Channel can be found in the Fibre Channel specification, which is ANSI document number ANSI/INCITS 373 entitled *Information Technology-Fibre Channel Framing and Signaling Interface (FC FS)*.

Each device is coupled to a switched fabric 110 utilizing at least one Fibre Channel link. For example, host 102 is coupled to fabric 110 utilizing link 102*a*. Host 104 is coupled to fabric 110 utilizing links 104*a* and 104*b*; storage subsystem 106 is coupled to fabric 110 utilizing link 106*a*; storage subsystem 108 is coupled to fabric 110 utilizing links 108*a* and 108*b*.

Each device is coupled to its Fibre Channel link through a Fibre Channel node port, i.e. an N-Port, included in the device. Host 102 includes N-Port 1 112. Host 104 includes N-Port 2 114 and N-port 3 116. Storage subsystem 106 includes N-Port 4 118. Storage subsystem 108 includes N-Port 5 120 and N-port 6 122.

Each N-port is coupled to fabric 110 utilizing a fabric port, i.e. an F-Port, that is included in fabric 110. Thus, a device is coupled to the fabric by coupling an N-Port, which is included in the device, to an F-Port, which is included in the fabric, utilizing a Fibre Channel communications link.

N-Port 1 112 is coupled to F-Port 1 124 utilizing Fibre Channel communications link 102*a*. N-Port 2 114 is coupled to F-Port 2 126 utilizing Fibre Channel communications link 104a. N-Port 3 116 is coupled to F-Port 3 128 utilizing Fibre Channel communications link 104b. N-Port 4 118 is coupled to F-Port 4 130 utilizing Fibre Channel communications link 106a. N-Port 5 120 is coupled to F-Port 5 132 utilizing Fibre Channel communications link 108a. N-Port 6 122 is coupled to F-Port 6 134 utilizing Fibre Channel communications link 108b.

Each host includes at least one Host Bus Adapter (HBA). When a host includes more than one HBA, the host can use any of its HBAs to communicate with the fabric. Host 102 includes HBA 135 which communicates with fabric 110 through N-Port 1 112, communications link 102a, and F-Port 1 124.

Host 104 includes HBA 136 which communicates with fabric 110 through N-Port 2 114, communications link 104a, and F-Port 2 126. Host 104 also includes HBA 137 which communicates with fabric 110 through N-Port 3 116, communications link 104b, and F-Port 3 128.

Each storage subsystem includes at least one Target Bus Adapter (TBA). When a storage subsystem includes more than one TBA, the storage subsystem can use any of its TBAs to communicate with the fabric.

Storage subsystem 106 includes TBA 138 which communicates with fabric 110 through N-Port 4 118, communications link 106a, and F-Port 4 130. Storage subsystem 108 includes TBA 139 which communicates with fabric 110 through N-Port 5 120, communications link 108a, and F-Port 5 132. Storage subsystem 108 also includes TBA 140 which communicates with fabric 110 through N-Port 6 122, communications link 108b, and F-Port 6 134.

Fabric 110 includes one or more switches, such as switch 141, for switching network packets through fabric 110. Although one switch is depicted, typically, many switches are included within a fabric. In the illustrative embodiment, each switch is a Fibre Channel (FC) switch that adheres to the Fibre Channel specification.

An association table is stored within each switch in the fabric. In the depicted example, association table 144 is stored within switch 141. In addition, a copy of the association table may also be stored within the storage subsystems. For example, association table 144 is stored within storage subsystem 106 and storage subsystem 108.

A name server table is also stored within each switch. Name server table 146 is stored within switch 141.

FIG. 2 depicts an association table in accordance with the illustrative embodiment of the present invention. Association table 144 includes authorized F-port/N-port pairs of names. A name, such as a World Wide Port Name (WWPN), for each F-port and the name, such as a WWPN, of its authorized N-port are stored in each entry. The WWPNs stored in each entry of association table 144 define an authorized pair.

For example, F-port 1 124 is coupled to N-port 1 112. Therefore, the WWPN for F-port 1 124 and the WWPN for N-port 1 112 are stored in entry 202. In the depicted example, the WWPN for F-port 1 124 is 1234ABCD5678ABCD and the WWPN for N-port 1 112 is ABCD23456789CDEF. Thus, an F-port WWPN of 1234ABCD5678ABCD and an N-port WWPN of ABCD23456789CDEF form an authorized pair.

As another example, F-port 2 126 is coupled to N-port 2 114. Therefore, the WWPN for F-port 2 126 and the WWPN for N-port 2 114 are stored in entry 204. In the depicted example, the WWPN for F-port 2 126 is DEFCBCDE4567A456 and the WWPN for N-port 2 114 is 345678901234A345. Thus, an F-port WWPN of DEFCBCDE4567A456 and an N-port WWPN of 345678901234A345 form an authorized pair.

As a final example, F-port 6 134 is coupled to N-port 6 122. Therefore, the WWPN for F-port 6 134 and the WWPN for N-port 6 122 are stored in entry 206. In the depicted example, the WWPN for F-port 6 134 is EFCABAB12345D456 and the WWPN for N-port 6 122 is 1112AACCCDEEFA1C4. Thus, an F-port WWPN of EFCABAB12345D456 and an N-port WWPN of 1112AACCCDEEFA1C4 form an authorized pair.

FIG. 3 depicts a name server table in accordance with the illustrative embodiment of the present invention. Each entry in the name server table includes each authorized pair of F-port and N-port WWPNs as well as the host source identifier (SID) of the entry's N-port.

Entry 302 includes the authorized F-port/N-port pair of entry 202 (see FIG. 2) as well as the host source identifier (SID) of N-port 1 112. Entry 304 includes the authorized F-port/N-port pair of entry 204 (see FIG. 2) as well as the host source identifier (SID) of N-port 2 114. Entry 304 includes the authorized F-port/N-port pair of entry 204 (see FIG. 2) as well as the host source identifier (SID) of N-port 6 122.

FIG. 4 depicts a high level flow chart that illustrates generating an association table and forcing all devices to log back into the fabric and storage subsystem once the association table is imported into the switches and storage subsystems in accordance with the illustrative embodiment of the present invention. The process starts as illustrated by block 400 and thereafter passes to block 402 which depicts generating an association table. The association table includes the authorized pairs of F-port names and N-port names. Next, block 404 illustrates all switches and/or storage subsystems importing the association table.

Block 406, then, depicts restarting all switches. Restarting all switches forces all hosts and storage subsystems to log back into the fabric using a fabric login (FLOGI) request. Thereafter, block 408 illustrates each storage subsystem forcing all hosts to log back into that storage subsystem using a port login (PLOGI) request. The process then terminates as depicted block 410.

FIG. 5 illustrates a high level flow chart that depicts restricting access to the fabric to only authorized devices in accordance with the illustrative embodiment of the present invention. The process starts as depicted by block 500 and thereafter passes to block 502 which illustrates a Fibre Channel (FC) switch receiving an FLOGI request to log into one of the Fibre Channel switch's F-ports. The F-port has a particular name, such as a World Wide Port Name (WWPN). The request includes the particular WWPN for the host's N-port that sent this request. Next, block 504 depicts the Fibre Channel switch collecting the WWPN for the host's N-port from the request. The WWPN included in the request and the F-port's WWPN form a "received pair".

Block 506, then, illustrates the Fibre Channel switch accessing its association table to look up the pair that includes the requesting N-port WWPN. The Fibre Channel switch obtains the F-port WWPN that is paired in the table with the requesting N-port's WWPN. The pair obtained from the association table forms an "authorized pair".

The process then passes to block 508 which depicts a determination of whether or not the received pair matches the authorized pair. If the received pair does not match the authorized pair, the process passes to block 510 which illustrates the Fibre Channel switch rejecting the FLOGI request. The process then terminates as depicted by block 512.

Referring again to block 508, if a determination is made that the received pair does match the authorized pair, the process passes to block 514 which illustrates the Fibre Channel switch accepting the FLOGI request. Next, block 516 depicts the Fibre Channel switch creating a source ID (SID) for the host's N-port and storing the WWPN for the host's N-port along with its SID in the Fibre Channel switch's name server table. Thereafter, block 518 illustrates the Fibre Channel switch sending the SID to the host so that the host can use the SID in future communications through the host's N-port. The process then terminates as depicted by block 512.

FIG. 6 depicts a high level flow chart that illustrates a receiving device restricting access to the receiving device to only those requesting devices that are authorized in accordance with the illustrative embodiment of the present invention. The process starts as illustrated by block 600 and thereafter passes to block 602 which depicts a receiving device, such as a host or storage subsystem, receiving a PLOGI request from a requesting device, such as a host or storage subsystem, through the requesting device's N-port to log into the receiving device. The request includes the requesting N-port's particular WWPN and source identifier (SID). Next, block 604 illustrates the receiving device collecting the requesting N-port's WWPN and SID from the request.

The process then passes to block 606 which depicts the receiving device accessing the name server table in its switch and obtaining the F-port WWPN from the table for the SID that is included in the PLOGI request. The N-port WWPN included in the request and the F-port WWPN obtained from the name server table form a "received pair". Block 608, then, depicts the receiving device accessing its association table to look up the pair that includes the N-port WWPN that was included in the request. The receiving device obtains the F-port's WWPN that is included in the table with the requesting N-port's WWPN. The pair obtained from the table forms an "authorized pair".

The process then passes to block 610 which depicts a determination of whether or not the received pair matches the authorized pair. If a determination is made that the received pair does not match the authorized pair, the process passes to block 612 which illustrates the receiving device rejecting the PLOGI request. The process then terminates as depicted by block 614. Referring again to block 610, if a determination is made that the received pair does match the authorized pair, the process passes to block 616 which depicts the receiving device accepting the PLOGI request. The process then terminates as illustrated by block 614.

FIGS. 7A and 7B together illustrate a high level flow chart that depicts a switch restricting access to a receiving device to only those requesting devices that are authorized in accordance with the illustrative embodiment of the present invention. The process starts as depicted by block 700 and thereafter passes to block 702 which illustrates a requesting device, such as a host or storage subsystem, making a PLOGI request through the requesting device's N-port to log into a particular receiving device, such as a host or storage subsystem. The request includes a particular WWPN and a particular source identifier (SID) for the requesting N-port. Next, block 704 depicts the switch opening the PLOGI request's header and collecting the WWPN that is included in the header. Block 706, then, illustrates the switch using the SID that was supplied in the request to query the switch's name server table to obtain the N-port WWPN from the name server table that is associated with this SID that was included in the request.

The process then passes to block 708 which depicts a determination of whether or not the N-port WWPN that was obtained from the request matches the N-port WWPN that was obtained from the name server table. If a determination is made that the N-port WWPN that was obtained from the request does not match the N-port WWPN that was obtained from the name server table, the process passes to block 710 which depicts the switch dropping the PLOGI request frame. The process then terminates as illustrated by block 712.

Referring again to block 708, if a determination is made that the N-port WWPN that was obtained from the request does match the N-port WWPN that was obtained from the name server table, the process passes to block 714 which depicts the switch looking up the F-port WWPN, which is associated with the request SID, from the name server table. Next, block 716 illustrates the N-port WWPN that was obtained from the request and the F-port WWPN that was obtained from the name server table forming a "received pair". Block 718, then, depicts the switch accessing its association table to look up the N-port/F-port pair that includes the N-port WWPN that was included in the request. The N-port/F-port pair obtained from the table forms an "authorized pair".

The process then passes to block 720 which illustrates a determination of whether or not the received pair matches the authorized pair. If a determination is made that the received pair does not match the authorized pair, the process passes to block 722 which depicts the switch dropping the PLOGI request frame. The process then terminates as illustrated by block 712.

Referring again to block 720, if a determination is made that the received pair does match the authorized pair, the process passes to block 724 which depicts the switch authorizing the PLOGI request. Block 726, then, illustrates the switch sending the PLOGI request frame to its destination. The process then terminates as depicted by block 712.

Figure 8:
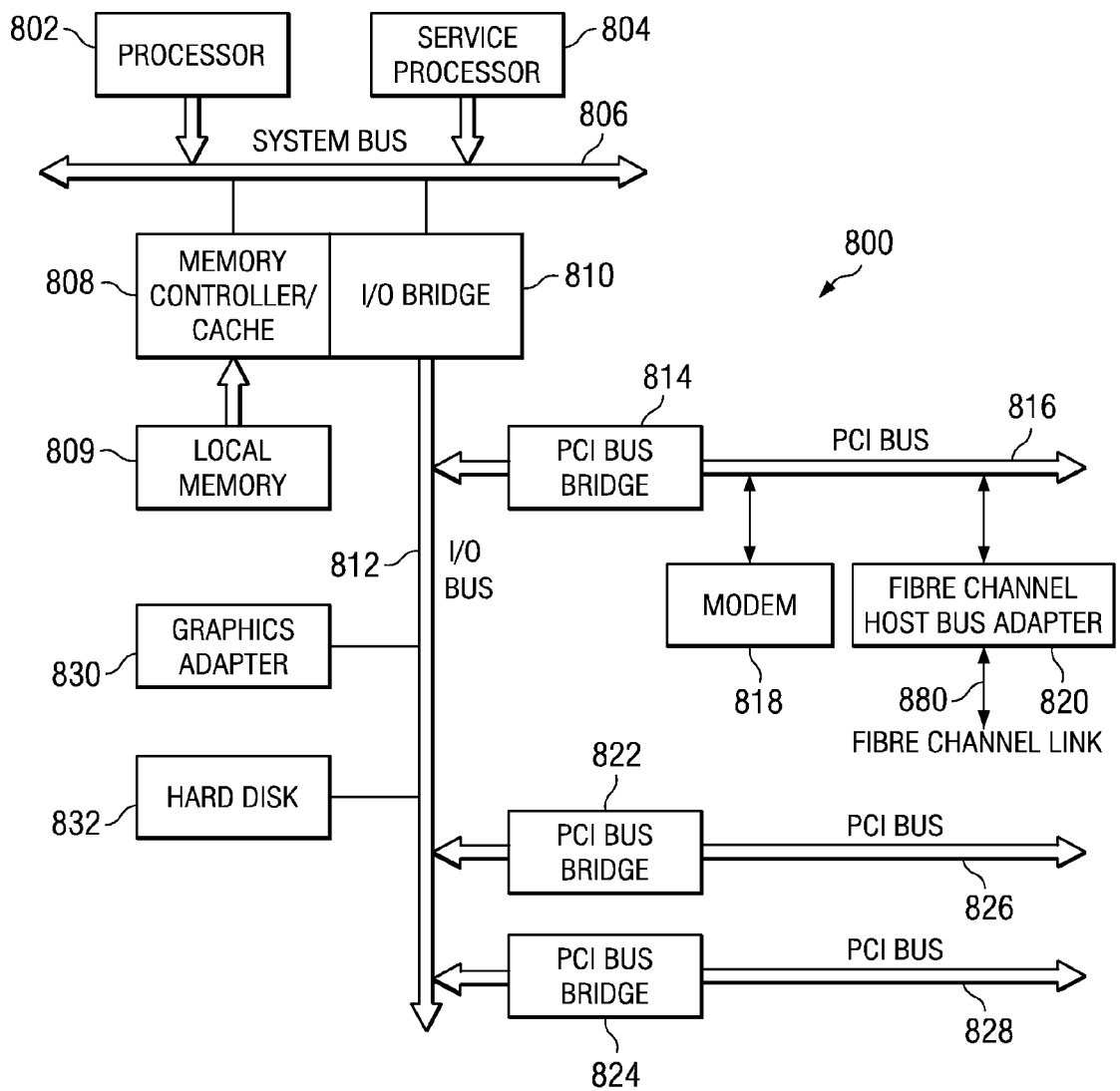
FIG. 8 is a block diagram of a data processing system that is used to implement any of the data processing systems of FIG. 1 in accordance with the present invention.

FIG. 8 is a block diagram of a data processing system that is used to implement any of the data processing systems of FIG. 1 in accordance with the present invention. Data processing system 800 may be a symmetric multiprocessor (SMP) system including a plurality of processors 802 and 804 connected to system bus 806. Alternatively, a single processor system may be employed. In the depicted example, processor 804 is a service processor. Also connected to system bus 806 is memory controller/cache 808, which provides an interface to local memory 809. I/O bus bridge 810 is connected to system bus 806 and provides an interface to I/O bus 812. Memory controller/cache 808 and I/O bus bridge 810 may be integrated as depicted.

Peripheral component interconnect (PCI) bus bridge 814 connected to I/O bus 812 provides an interface to PCI local bus 816. A number of I/O adapters, such as modem 818 may be connected to PCI bus 816. Typical PCI bus implementations will support four PCI expansion slots or add-in connectors. Communications links to other computers may be provided through modem 818 and Fibre channel host bus adapter 820. Host Bus Adapter (HBA) 820 enables data processing system 800 to send and receive messages from fabric 110 via a Fibre Channel link 880.

Additional PCI bus bridges 822 and 824 provide interfaces for additional PCI buses 826 and 828, from which additional modems or network adapters may be supported. In this manner, data processing system 800 allows connections to multiple network computers.

A memory-mapped graphics adapter 830 and hard disk 832 may also be connected to I/O bus 812 as depicted, either directly or indirectly.

The advantages of the illustrative embodiment of the present invention are numerous. The illustrative embodiment of the present invention provides a security solution to prevent storage subsystem and device WWPN spoofing.

The illustrative embodiment of the present invention requires the generation of a simple table by a SAN administrator in order to define the authorized connections by defining authorized N-port/F-port pairs.

The illustrative embodiment of the present invention can be implemented by a FC switch operating environment, and/or storage subsystem port interface microcode, for example.

The illustrative embodiment of the present invention is not dependent on any specific hardware, software, or operating system, and can easily be deployed in a SAN consisting of heterogeneous hosts, switches, and storage subsystems.

The illustrative embodiment of the present invention works within the existing Fibre Channel NCITS T11 workgroup protocol standards.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method in a storage area network that includes a switched-fabric for securing access to storage node ports, said computer-implemented method comprising:

specifying authorized combinations of fabric port identifiers and node port identifiers in an association table, wherein the authorized combinations are the only combinations that are permitted to access a particular storage node port;

receiving, from a device, a request to access said particular storage node port;

determining a particular node port identifier, from said request, that identifies a particular node port that is included in said device that is attempting to access said particular storage node port;

determining a particular fabric port identifier that identifies a particular fabric port that is included in a switch through which said device transmitted said request; and determining, using the association table, whether a particular combination of said particular fabric port identifier and said particular node port identifier forms an authorized combination by determining whether said particular combination is stored in said association table, and wherein said particular combination is an authorized combination only if said particular combination is stored in said association table.

2. The computer-implemented method according to claim 1, further comprising:

in response to determining that said particular fabric port identifier and said particular node port identifier pair do form an authorized combination, permitting access to said particular storage node port by said device; and in response to determining that said particular fabric port identifier and said particular node port identifier pair does not form an authorized combination, prohibiting access to said particular storage node port by said device.

3. The computer-implemented method according to claim 1, wherein said step of determining a particular fabric port identifier that identifies a particular fabric port through which said device transmitted said request further comprises determining a fabric port identifier that identifies a fabric port through which said device logged onto said fabric.

4. The computer-implemented method according to claim 1, further comprising:

storing said authorized combinations of fabric port identifiers and node port identifiers in each switch in said fabric;

receiving, by a first switch, said request to access said particular storage node port;

determining, by said first switch, whether said particular fabric port identifier and said particular node port identifier form said authorized combination;

in response to determining, by said first switch, that said particular fabric port identifier and said particular node port identifier pair do form said authorized combination, forwarding said request to said particular storage node port;

granting, by said particular storage node port, access to said particular storage node port in response to said particular storage node port receiving said request; and in response to determining, by said first switch, that said particular fabric port identifier and said particular node port identifier pair does not form said authorized combination, discarding, by said first switch, said request wherein said particular storage node port does not receive or process said request and wherein access to said particular storage node port is prohibited.

5. The computer-implemented method according to claim 1, further comprising:
storing said authorized combinations of fabric port identifiers and node port identifiers in said particular storage node port;
receiving, by said particular storage node port, said request to access said particular storage node port;
determining, by said particular storage node port, whether said particular fabric port identifier and said particular node port identifier form an authorized combination;
in response to determining, by said particular storage node port, that said particular fabric port identifier and said particular node port identifier pair do form said authorized combination, processing, by said particular storage node port, said request wherein access to said particular storage node port is granted; and
in response to determining, by said particular storage node port, that said particular fabric port identifier and said particular node port identifier pair does not form said authorized combination, discarding, by said particular storage node port, said request wherein access to said particular storage node port is prohibited.

6. The computer-implemented method according to claim 1, wherein said step of receiving, from a device, a request to access a particular storage node port further comprises receiving, from a device, a port login request to log into said particular storage node port, wherein said port login request is a PLOGI Fibre Channel protocol request.

7. The computer-implemented method according to claim 1, further comprising:
prior to receiving said request to access said particular storage node port:
receiving, by said particular fabric port, a login request from said device to log into said fabric, wherein said login request is an FLOGI Fibre Channel protocol request;
determining, by said switch using said login request, said particular node port identifier;
determining, by said switch using said login request, said particular fabric port identifier; and
determining whether said particular fabric port identifier and said particular node port identifier form said authorized combination, wherein said device is permitted to log into said fabric if said particular fabric port identifier and said particular node port identifier form said authorized combination.

8. The computer-implemented method according to claim 7, further comprising:
in response to determining that said particular fabric port identifier and said particular node port identifier form said authorized combination, processing, by said switch, said login request wherein said device is logged into said fabric; and
in response to determining that said particular fabric port identifier and said particular node port identifier does not form said authorized combination, discarding, by said switch, said login request wherein said device is prohibited from accessing said fabric through said fabric port.

9. An apparatus in a storage area network that includes a switched-fabric for securing access to storage node ports, said apparatus comprising:
a physical storage device within which an association table is stored, wherein authorized combinations of fabric port identifiers and node port identifiers are stored in the association table, wherein the authorized combinations are the only combinations that are permitted to access a particular storage node port;
wherein:
said particular storage node port receiving, from a device, a request to access said particular storage node port;
said particular storage node port determining a particular node port identifier, from said request, that identifies a particular node port that is included in said device that is attempting to access said particular storage node port;
said particular storage node port determining a particular fabric port identifier that identifies a particular fabric port that is included in a switch through which said device transmitted said request; and
said particular storage node port determining, using said association table, whether a particular combination of said particular fabric port identifier and said particular node port identifier forms an authorized combination by determining whether said particular combination is stored in said association table, and wherein said particular combination is an authorized combination only if said particular combination is stored in said association table.

10. The apparatus according to claim 9, wherein:
in response to determining that said particular fabric port identifier and said particular node port identifier pair do form an authorized combination, said particular storage node port permitting access to said particular storage node port by said device; and
in response to determining that said particular fabric port identifier and said particular node port identifier pair does not form an authorized combination, said particular storage node port prohibiting access to said particular storage node port by said device.

11. The apparatus according to claim 9, wherein said particular storage node port determining a particular fabric port identifier that identifies a particular fabric port through which said device transmitted said request further comprises said particular storage node port determining a fabric port identifier that identifies a fabric port through which said device logged onto said fabric.

12. The apparatus according to claim 9, wherein:
said fabric including a first switch for storing said authorized combinations of fabric port identifiers and node port identifiers in said first switch;
said first switch intercepting said request to access said particular storage node port before said particular storage node port receives said request;
said first switch determining whether said particular fabric port identifier and said particular node port identifier form said authorized combination;
in response to determining, by said first switch, that said particular fabric port identifier and said particular node port identifier pair do form said authorized combination, said first switch forwarding said request to said particular storage node port;
said particular storage node port granting access to said particular storage node port in response to said particular storage node port receiving said request; and
in response to determining, by said first switch, that said particular fabric port identifier and said particular node port identifier pair do not form said authorized combination, said first switch discarding said request wherein said particular storage node port does not receive or process said request and wherein access to said particular storage node port is prohibited.

13. The apparatus according to claim 9, wherein a particular storage node port receiving, from a device, a request to access a particular storage node port further comprises a particular storage node port receiving, from a device, a port login request to log into said particular storage node port, wherein said port login request is a PLOGI Fibre Channel protocol request.

14. The apparatus according to claim 9, wherein:
prior to said particular storage node port receiving said request to access said particular storage node port:
said particular fabric port receiving a login request from said device to log into said fabric, wherein said login request is an FLOGI Fibre Channel protocol request;
said first switch determining said particular node port identifier using said login request;
said first switch determining said particular fabric port identifier; and
said first switch determining whether said particular fabric port identifier and said particular node port identifier form said authorized combination, wherein said device is permitted to log into said fabric if said particular fabric port identifier and said particular node port identifier form said authorized combination.

15. The apparatus according to claim 14, wherein:
in response to determining that said particular fabric port identifier and said particular node port identifier form said authorized combination, said first switch processing said login request wherein said device is logged into said fabric; and
in response to determining that said particular fabric port identifier and said particular node port identifier do not form said authorized combination, said first switch discarding said login request wherein access to said fabric through said fabric port is prohibited.

16. A computer program product comprising a non-transitory computer-readable medium, the non-transitory computer-readable medium including computer usable program code for securing access to storage node ports in a storage area network that includes a switched-fabric, said computer usable program code comprising:
computer usable program code for specifying authorized combinations of fabric port identifiers and node port identifiers in an association table, wherein the authorized combinations are the only combinations that are permitted to access a particular storage node port;
computer usable program code for receiving, from a device, a request to access said particular storage node port;
computer usable program code for determining a particular node port identifier from said request that identifies a particular node port that is included in said device that is attempting to access said particular storage node port;
computer usable program code for determining a particular fabric port identifier that identifies a fabric port that is included in a first switch through which said device transmitted said request; and
computer usable program code for determining, the association table, whether said particular fabric port identifier and said particular node port identifier form an authorized combination stored in said association table.

17. The computer program product according to claim 16, further comprising:
computer usable program code for permitting access to said particular storage node port by said device, in response to determining that said particular fabric port identifier and said particular node port identifier pair do form said authorized combination; and
computer usable program code for prohibiting access to said particular storage node port by said device, in response to determining that said particular fabric port identifier and said particular node port identifier pair do not form said authorized combination.

18. The computer program product according to claim 16, further comprising:
computer usable program code for storing said authorized combinations of fabric port identifiers and node port identifiers in each switch in said fabric;
computer usable program code for receiving, by a first switch in said fabric, said request to access said particular storage node port;
computer usable program code for determining, by said first switch, whether said particular fabric port identifier and said particular node port identifier form said authorized combination;
computer usable program code for forwarding said request to said particular storage node port, in response to determining, by said first switch, that said particular fabric port identifier and said particular node port identifier pair do form said authorized combination;
computer usable program code for granting, by said particular storage node port, access to said particular storage node port in response to said particular storage node port receiving said request; and
computer usable program code for discarding, by said first switch, said request wherein said particular storage node port does not receive or process said request and wherein access to said particular storage node port is prohibited, in response to determining, by said first switch, that said particular fabric port identifier and said particular node port identifier pair do not form said authorized combination.

19. The computer program product according to claim 16, further comprising:
wherein, prior to receiving said request to access said particular storage node port:
computer usable program code for receiving, by said particular fabric port, a login request from said device to log into said fabric, wherein said login request is an FLOGI Fibre Channel protocol request;
computer usable program code for determining, by said switch using said login request, said particular node port identifier;
computer usable program code for determining, by said switch using said login request, said particular fabric port identifier; and
computer usable program code for determining whether said particular fabric port identifier and said particular node port identifier form said authorized combination, wherein said device is permitted to log into said fabric if said particular fabric port identifier and said particular node port identifier form said authorized combination.

20. The computer program product according to claim 19, further comprising:
computer usable program code for processing, by said switch, said login request wherein said device is logged into said fabric, in response to determining that said particular fabric port identifier and said particular node port identifier form said authorized combination; and
computer usable program code for discarding, by said switch, said login request wherein access to said fabric through said fabric port is prohibited, in response to determining that said particular fabric port identifier and said particular node port identifier do not form said authorized combination.

* * * * *